US008037197B2

(12) United States Patent
Kamiyai et al.

(10) Patent No.: US 8,037,197 B2
(45) Date of Patent: Oct. 11, 2011

(54) CLIENT-SIDE SELECTION OF A SERVER

(75) Inventors: Masanori Kamiyai, Tokyo (JP); Norie Iwasaki, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 11/925,361

(22) Filed: Oct. 26, 2007

(65) Prior Publication Data

US 2009/0113447 A1 Apr. 30, 2009

(51) Int. Cl.
*G06F 15/16* (2006.01)

(52) U.S. Cl. ........ 709/230; 709/237; 709/238; 709/242; 370/465; 370/351; 710/105

(58) Field of Classification Search .................. 709/101, 709/202, 224, 225, 246; 370/352; 719/314, 719/316, 328
See application file for complete search history.

(56) References Cited

U.S. PATENT DOCUMENTS

| 7,062,516 B2* | 6/2006 | Bhat ............................ 707/694 |
| 7,069,321 B1* | 6/2006 | Curtis et al. .................. 709/225 |
| 7,343,409 B1* | 3/2008 | Kremer et al. ................ 709/224 |
| 2002/0167942 A1* | 11/2002 | Fulton .......................... 370/352 |
| 2002/0199022 A1* | 12/2002 | Tsang et al. .................. 709/246 |
| 2003/0055862 A1* | 3/2003 | Bhat ............................ 709/101 |
| 2003/0204557 A1* | 10/2003 | Mandal et al. ................ 709/202 |
| 2005/0172306 A1* | 8/2005 | Agarwal et al. ............... 719/328 |
| 2006/0140370 A1* | 6/2006 | Agarwal et al. .......... 379/114.28 |
| 2006/0248340 A1* | 11/2006 | Lee et al. ....................... 713/181 |
| 2007/0073877 A1* | 3/2007 | Boykin et al. ................ 709/225 |
| 2008/0098321 A1* | 4/2008 | Krithivas ....................... 715/771 |

OTHER PUBLICATIONS

Blair et al. "System Management Architecture for Mobile and Desktop Hardware White Paper." Distributed Management Task Force, Inc. Web. Feb. 2007.*
Seo et al. "WBEM-Based SLA Management Across Multi-domain Networks for QoS-Guaranteed DiffServ-over-MPLS Provisioning." Lecture Notes in Computer Science, 2006. Web.*

* cited by examiner

*Primary Examiner* — Glenton B Burgess
*Assistant Examiner* — Michael Martinez
(74) *Attorney, Agent, or Firm* — Griffiths & Seaton PLLC

(57) ABSTRACT

A method, system, and computer program product for performing network device management and client load distribution to a number of the Common Information Model Object Manager (CIMOM) servers via a network path. A client-side server selection (CSS) utility allows a client to choose the ideal server to fulfill a CIM request message. The client transmits the CIM request message to the CIMOM server based on service response time information utilized by the CSS utility. The CIM request message is forwarded to a CIM provider for processing. The provider returns a CIM response message to the CIMOM and a service response time is generated. Thereafter, the CIMOM returns the CIM response message to the client. At a preset time period, a Service Location Protocol (SLP) advertise generation facility initiates a multicast of the service response time information (from all network CIMOM servers) to the CSS utility.

18 Claims, 14 Drawing Sheets

1300

1301

$$T_{rp}(j) = \frac{\sum_{i=1}^{n} T_r(i, j)}{n}$$

1302

$$A_{tr}(i, j) = \frac{T_r(i, j)}{T_{rp}(j)}$$

1303

$$A_{tr} = \begin{pmatrix} A_{tr}(1,1) & A_{tr}(1,2) & \cdots & A_{tr}(1,j) & \cdots & A_{tr}(1,m) \\ A_{tr}(2,1) & A_{tr}(2,2) & \cdots & A_{tr}(2,j) & \cdots & A_{tr}(2,m) \\ \vdots & \vdots & \cdots & \vdots & \cdots & \vdots \\ A_{tr}(i,1) & A_{tr}(i,2) & \cdots & A_{tr}(i,j) & \cdots & A_{tr}(i,m) \\ \vdots & \vdots & \cdots & \vdots & \cdots & \vdots \\ A_{tr}(n,1) & A_{tr}(n,2) & \cdots & A_{tr}(n,j) & \cdots & A_{tr}(n,m) \end{pmatrix}$$

1304

$$t_r = \begin{pmatrix} t_r(1) \\ t_r(2) \\ \vdots \\ t_r(i) \\ \vdots \\ t_r(n) \end{pmatrix}$$

1401
$$\sum_{j=1}^{m} r_p(j) = 1$$

1402
$$Tr(i,j) := \{nr(i,j) \cdot Tr(i,j) + tr(i,j)\} / \{nr(i,j) + 1\}$$

1403
$$nr(i,j) := nr(i,j) + 1$$

1405
$$d_s = \frac{\sum_{j=1}^{m}\sum_{i=1}^{n} T_r(i,j)}{m \cdot n} A_{tr} \cdot r_p^T + t_s$$

1406
$$d_s = \frac{\sum_{j=1}^{m}\sum_{i=1}^{n} T_r(i,j)}{m \cdot n} \begin{pmatrix} \sum_{j=1}^{m}\{A_{tr}(1,j) \cdot r_p(j)\} \\ \sum_{j=1}^{m}\{A_{tr}(2,j) \cdot r_p(j)\} \\ \vdots \\ \sum_{j=1}^{m}\{A_{tr}(i,j) \cdot r_p(j)\} \\ \vdots \\ \sum_{j=1}^{m}\{A_{tr}(n,j) \cdot r_p(j)\} \end{pmatrix} + \begin{pmatrix} t_s(1) \\ t_s(2) \\ \vdots \\ t_s(i) \\ \vdots \\ t_s(n) \end{pmatrix}$$

FIG. 14

CLIENT-SIDE SELECTION OF A SERVER

BACKGROUND

1. Technical Field

The present invention generally relates to computer network systems and in particular to the management of computer network systems.

2. Description of the Related Art

Management of computer systems requires measurement data to be collected from components of the managed systems. The measurement data thus collected has to be maintained in the form of a data model that builds relationships between components of the managed system. Often to manage computer systems, it is important to capture more complex information about the system, such as information about operations, sequencing of interactions, and composition relationships between components. The Common Information Model (CIM) presents an object-oriented data model that captures complex relationships between managed components. A Common Information Model Object Manager (CIMOM) is a server utilizing the Common Information Model (CIM) protocol during network device management and load distribution of a network path. In conventional methods of managing the CIM, there is no methodology employing client load distribution among a cluster of CIMOM servers via a network path.

SUMMARY OF ILLUSTRATIVE EMBODIMENTS

Disclosed are a method, system, and computer program product for performing network device management and client load distribution to a number of the Common Information Model (CIM) Object Manager (CIMOM) servers via a network path. A client-side server selection (CSS) utility allows a client to choose the ideal server to fulfill a CIM request message. The client transmits the CIM request message to the CIMOM server based on service response time information utilized by the CSS utility. The CIM request message is forwarded to a CIM provider for processing. The provider returns a CIM response message to the CIMOM, and a service response time is generated. Thereafter, the CIMOM returns the CIM response message to the client. At a preset time period, a Service Location Protocol (SLP) advertise generation facility initiates a multicast of the service response time information (from all network CIMOM servers) to the CSS utility.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 13 illustrates a number of equations by which features of the invention may be advantageously implemented, according to one embodiment of the invention; and FIG. 14 illustrates a number of equations by which features of the invention may be advantageously implemented, according to one embodiment of the invention.

DETAILED DESCRIPTION OF AN ILLUSTRATIVE EMBODIMENT

Figure 1:
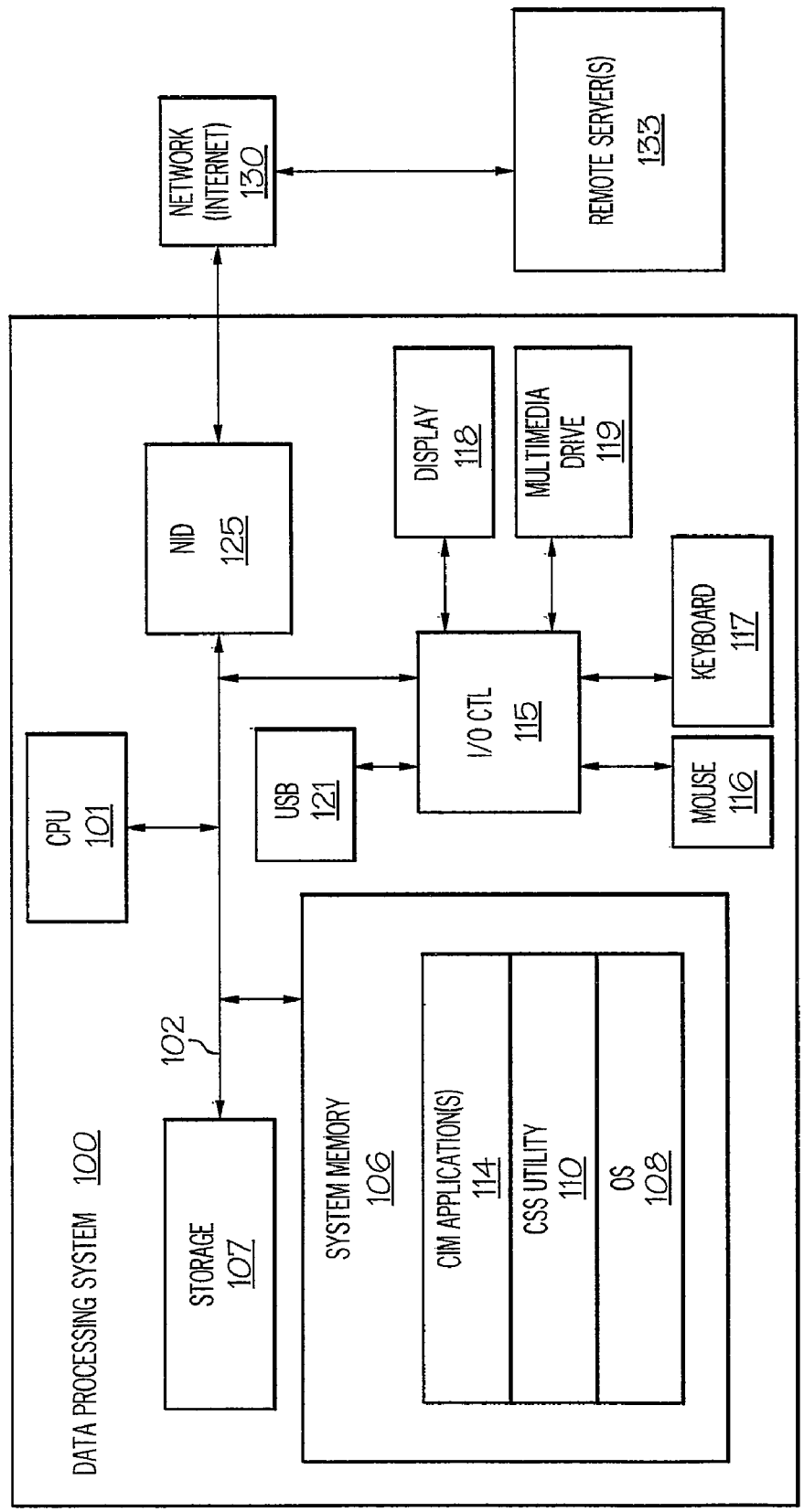
FIG. 1 is a block diagram representation of a data processing system, according to one embodiment of the invention.

The illustrated embodiments provide a method, system, and computer program product for performing network device management and client load distribution to a number of the Common Information Model Object Manager (CIMOM) servers via a network path. A client-side server selection (CSS) utility employs a facility to select the ideal server to fulfill a client's CIM request message, based on the following: (1) CIM provider request frequency, updated each time a request is made; (2) response time information; and (3) CIMOM average response time, obtained from the (ICMP echo packets which measure) response time to each CIMOM. Receipt of the CIM request message at the CIMOM server triggers a series of steps which include the following: (1) time of request receipt is recorded; (2) the request is transferred to a CIM provider for processing; (3) a response is returned to the CIMOM; (4) time of response receipt is recorded; and (5) a service response time is generated. Thereafter, the CIMOM returns the CIM response message to the client. At a preset time period, a Service Location Protocol (SLP) advertise generation facility initiates a multicast of the service response time information (from all network CIMOM servers) to the CSS utility In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, there is depicted a block diagram representation of a data processing system (and connected network). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored.

DPS 100 is also illustrated with a network interface device (NID) 125, with which DPS 100 connects to one or more servers 133 via access network 130, such as the Internet. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, or GNU®/Linux®, registered trademarks of the Free Software Foundation and The Linux Mark Institute), Common Information Model (CIM) application(s) 114, and client-side server selection (CSS) utility 110. In actual implementation, CIM application(s) 114 and CSS utility 110 may be combined as a single application collectively providing the various functions of each individual software component when the corresponding code is executed by the CPU 101. For simplicity, CSS utility 110 is illustrated and described as a stand alone or separate software/firmware component, which provides specific functions, as described below.

CPU 101 executes CIM APP 114, CSS utility 110 as well as OS 108, which supports the user interface features of CSS utility 110. In the illustrative embodiment, CSS utility 110 generates/provides several graphical user interfaces (GUI) to enable user interaction with, or manipulation of, the functional features of the utility (110). Among the software code/instructions provided by CSS utility 110, and which are specific to the invention, are: (a) code for selecting an ideal Common Information Model Object Manager (CIMOM) server to fulfill a CIM message request; (b) code for transmitting a CIM message request from a CIM application to a CIMOM server; and (c) code for triggering the transfer of service response time information about a number of CIMOM servers to a CIM client. For simplicity of the description, the collective body of code that enables these various features is referred to herein as CSS utility 110. According to the illustrative embodiment, when CPU 101 executes CSS utility 110, DPS 100 initiates a series of functional processes that enable the above functional features as well as additional features/functionality, which are described below within the description of FIGS. 3-12.

DPS 100 may represent a Common Information Model (CIM) client which connects to a network of Common Information Model Object Manager (CIMOM) servers and CIM providers by utilizing the CIM protocol.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
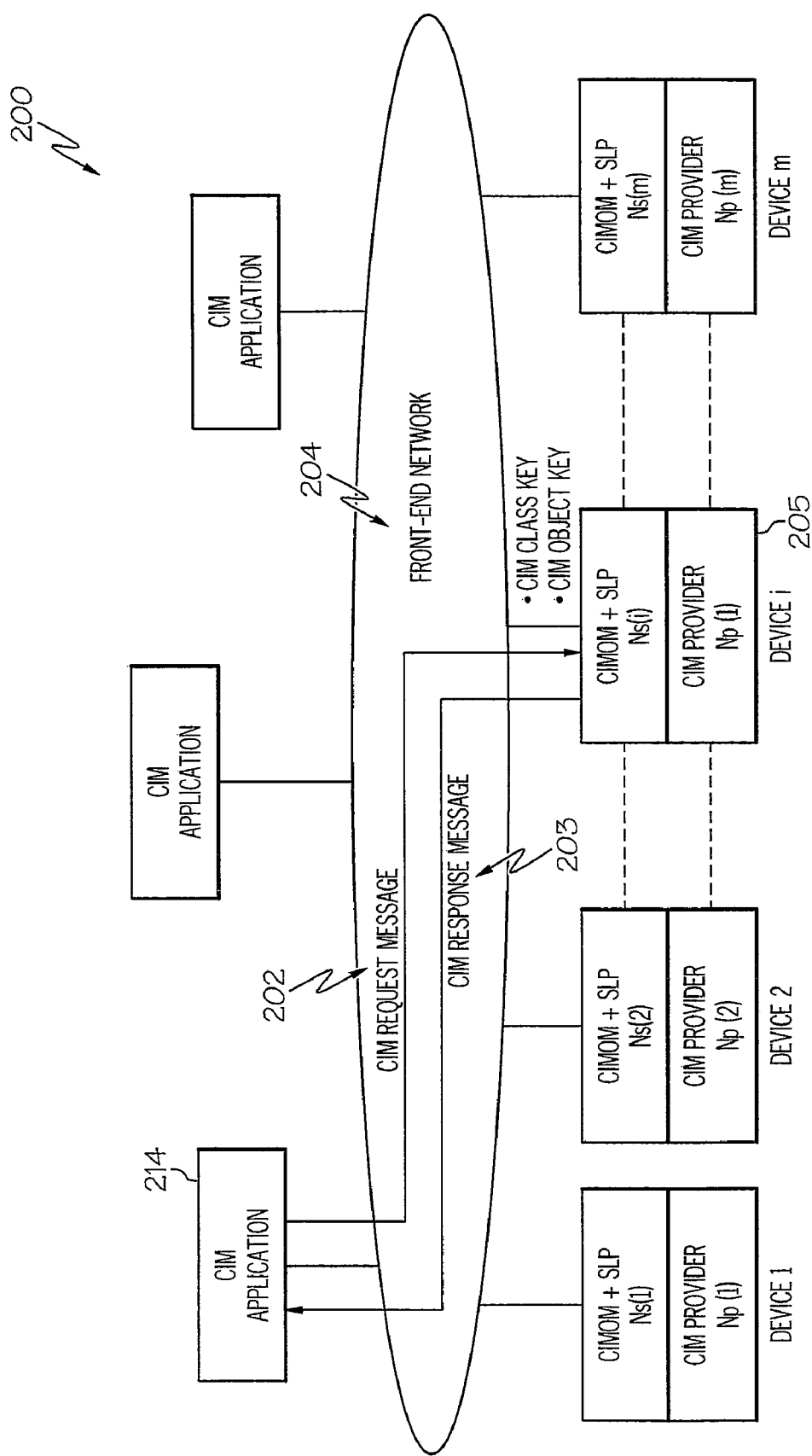
FIG. 2 is an illustration of a network device management method which employs a conventional Common Information Model (CIM), according to the prior art.

FIG. 2 is an illustration of a network device management system which employs a conventional Common Information Model (CIM), according to the prior art. Network 200 comprises CIM application 214 residing on a DPS (not explicitly shown). CIM application 214 submits CIM request message 202 via front-end network 204 to a Common Information Model Object Manager (CIMOM) located on server/device i 205. In network 200, server 205 returns CIM response message 203 to CIM application 201 via front-end network 204.

CIM application 214 on an operation device has access to a CIMOM on server 205 using the Service Location Protocol (SLP). In addition to providing information regarding the location of services such as IP address and port number, the SLP also provides information that may be uniquely defined by application attributes on the service provider side. CIM application 214 sends CIM request message 202 to the CIMOM. CIM request message 202 contains commands for management operations to be executed on a management object device (illustrated by server 205).

CIM request message 202 is interpreted by a lexical analysis facility within the CIMOM. In order to make an application programming interface (API) unique to the management object device (which receives CIM request message 202), key data (i.e., CIM class and CIM object) contained within CIM request message 202 are retrieved. By checking the key data with repository databases managed by the CIMOM, a device API managed by a CIM provider (which corresponds to the CIM class of the key data) is executed. The CIM provider located on the same device (server 205) as the CIMOM manages the device API. The device API, which is initiated by the CIM provider, operates as a separate process from the CIMOM. Upon completing the processing of the CIM request message 202, the device API returns CIM response message 203 through the CIM provider to the CIMOM. The CIMOM, which received CIM response message 203, returns CIM response message 203 to CIM application 214. In order to facilitate the device management objectives of CIM application 214, a program to display sequential real time status information is included in CIM application 214.

Network 200 exhibits an obvious inefficiency when CIM request messages (202) from the CIM application (214) are received with a high arrival frequency at the CIMOM. For example, under a circumstance where there is a device i (e.g., server 205) with CIMOM Ns (i) and CIM provider Np (i), and a large number of CIM requests concentrated in the conventional system, only the CIMOM Ns (i) performs lexical analysis for all requests sent to device i and verifies the repository database. This processing (i.e., lexical analysis, etc.) solely by the CIMOM Ns (i) continues even when other CIMOM servers are under low load conditions.

Figure 3:
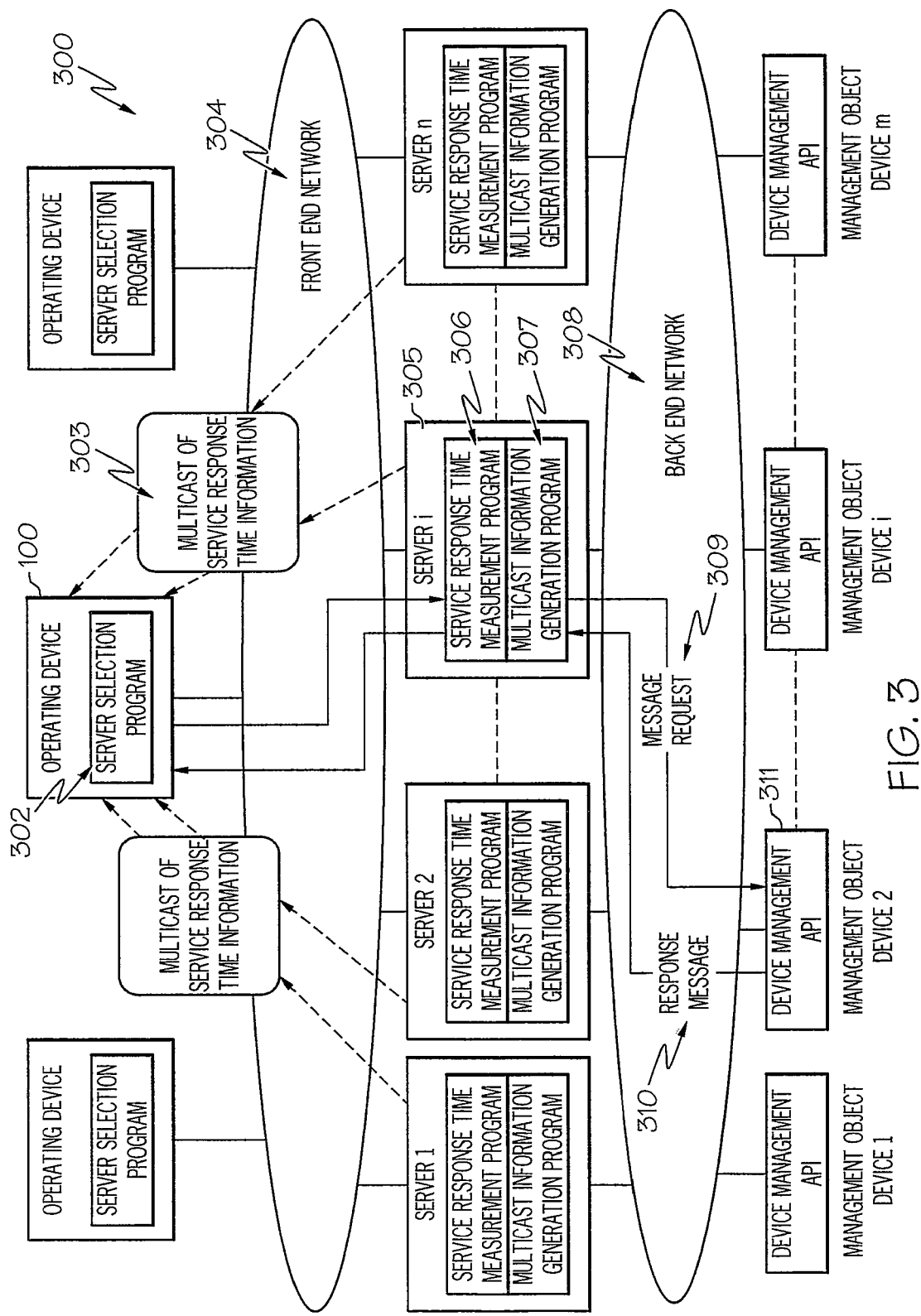
FIG. 3 illustrates a network, in which features of the invention may be advantageously implemented, according to one embodiment of the invention.

With reference now to FIG. 3, a network, in which features of the invention may be advantageously implemented, is illustrated, according to one embodiment of the invention. Network 300 comprises a number of DPSs (operating devices) 100 which may each include a device management application (not explicitly shown). DPS 100 also includes server selection program/facility 302 which may be integrated into the device management application. The application submits request message 309 via front-end network 304 to server 305. Server 305 is equipped with service response time measurement program/facility 306 and multicast information generation facility 307. Server 305 connects via back-end network 308 to a device management API located within management object device 2 311. Network 300 also comprises multiple servers and multiple management object devices. The device management application is able to initiate the multicast transfer of service response time information 303 via multicast information generation facility 307 located in each of the servers (which are capable of receiving message requests from the application).

Network 300 enables load distribution among a server cluster, which (cluster) has a weight on the access responsiveness of a management object device to an operating device. Each operating device (e.g., DPS 100) (generally) utilizes the management object device (e.g., management object device 2 311) at a high frequency. The load distribution among a cluster of servers is achieved with a network configuration that features: (1) an operating device which is connected to the server cluster via the transmission object network; (2) a server cluster that transmits multicast information that determines the selection of a server (e.g., server 305) within the cluster: the selected server may be the server that processes, at a minimum response time, all requests intended for a management object device; (3) a management object device which processes message requests; (4) a file of network response time to the server; (5) access frequency information of management object devices; (6) an application with which a device manager may transmit requests to a management object device (e.g., management object device 2 311) via the server through front-end network 304.

A server device, which receives a request to manage execution queue matrices, selects device management API located in the management object device. The management object device (e.g., management object device 2 311) receives the request through back-end network 308 from the server. After processing by the management object device, the server receives a response (to the request) 310 transmitted by the device management API. The server then transfers the received response (310) to an operating device (100). The transmission of response message 310 initiates the generation of multicast information. This information is obtained from the results of measuring service response time in transmitting information to front-end network 304.

Figure 4:
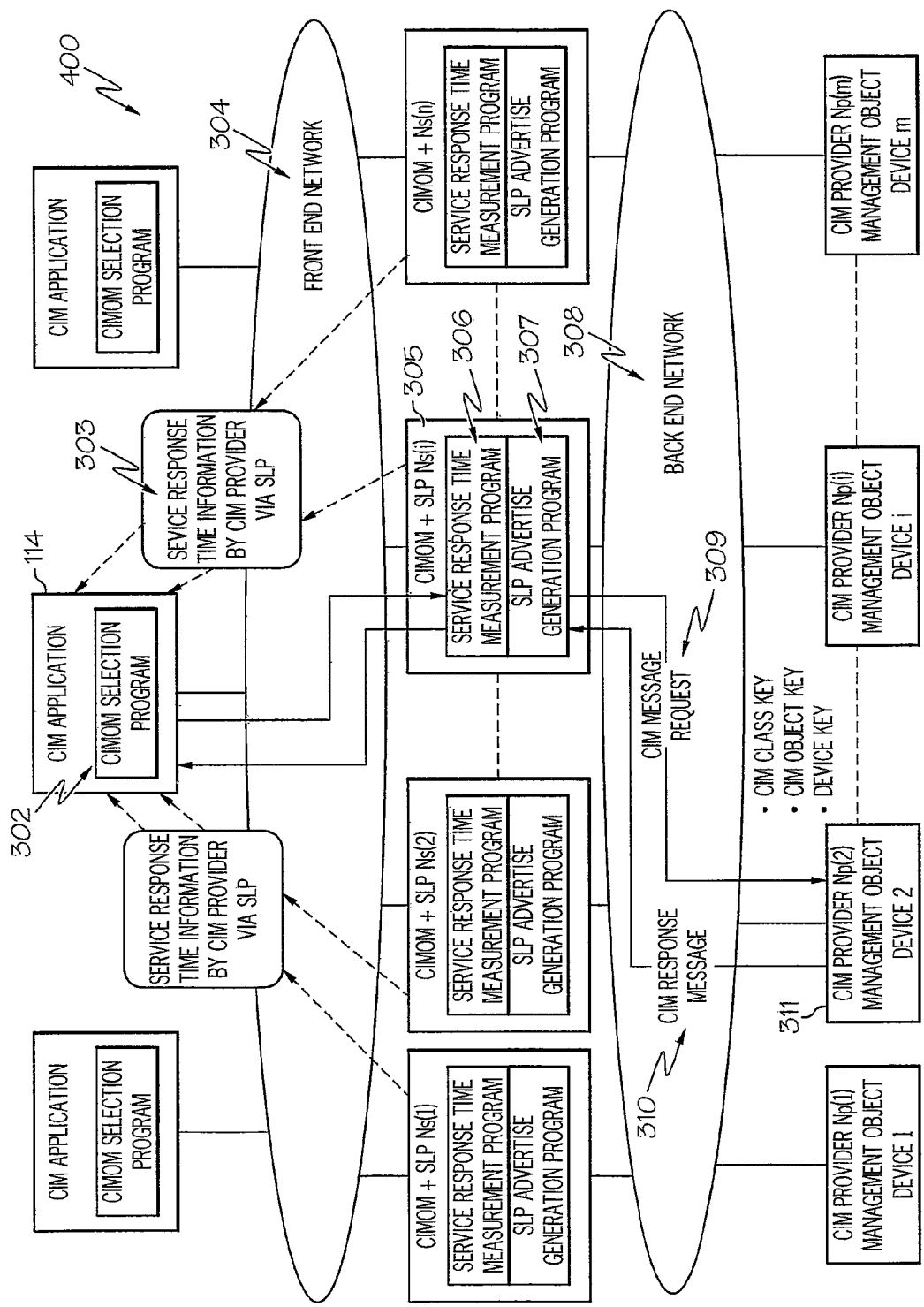
FIG. 4 is an illustration of a network device management method which employs a Common Information Model (CIM), according to one embodiment of the invention.

FIG. 4 is an illustration of a network device management method which employs a Common Information Model (CIM), according to one embodiment of the invention. CIM Network 400 comprises CIM application 114 residing on DPS 100 (not explicitly shown). CIM application 114 submits CIM request message 309 via front-end network 304 to Common Information Model Object Manager (CIMOM) 305 located on a DPS (not explicitly shown) which may be similar to DPS 100. CIMOM 305 is equipped with service response time measurement program/facility 306 and Service Location Protocol (SLP) advertise generation program/facility 307. CIMOM 305 connects via back-end network 308 to a CIM provider Np(2) located on management object device 2 311. CIM network 400 also includes multiple CIMOMs and multiple CIM providers. CSS utility 110 (FIG. 1) is able to initiate the multicast transfer of service response time information 303 via the SLP advertise generation facility located in the CIMOM servers.

In network 400, the CIMOM and CIM provider are connected through the back-end network and a connection to the management object device is provided via one of multiple CIMOMs. In network 400, load distribution among the CIMOMs is enabled. The load distribution determines the access responsiveness of the management object device to CIM client application 114. In general, CIM application 114 utilizes the management object device (e.g., management object device 2 311) at a high frequency. The load distribution is achieved by implementing CIMOM selection facility 302 in CIM application 114, which utilizes (as evaluation information) (1) provider service response time information, (2) request frequency information, and (3) CIMOM response time information.

Front-end network 304, between the CIM application 114 and CIMOM 305, expands the CIM request message path to perform management operations (for a certain management object device) into a path through multiple CIMOMs.

In network 400, (provider) service response time information is utilized for the management operation of each CIMOM. CIMOM response time information related to connections between CIM application 114 and CIMOM is used in selecting the CIMOM, which processes the CIM request with minimum response time. Thus, load distribution is facilitated among the CIMOMs via front-end network 304.

In network 400, the frequency of usage of the management object device factors into the selection of the CIMOM and (frequency of usage information) is included with the CIMOM selection information. An operator may select a particular CIMOM as a result of access responsiveness to the management object device at higher frequencies of usage.

CIMOM 305 and the CIM provider are connected via back-end network 308. The CIM provider, located on management object device 2 311, has an interface function (that is accessible from the CIMOM), as well as a function to configure the management object device and acquire the (request) state.

CIM application 114 transmits CIM request message 309 to the CIMOM based on a determination by CIMOM selection facility 302. In CIM request message 309, in addition to the CIM class and key data of the CIM object, device key data specifying the management object device is included. CIMOM selection facility 302 uses service response time information as an index of measuring the responsiveness of the CIMOM and back-end network 308. Moreover, CIMOM selection facility 302 uses the CIM provider request frequency information which represents the frequency of usage of the management object device processing the request made by CIM application 114. The CIM provider request frequency information provides an index for weighting the access responsiveness of the management object device (utilized with high frequency by CIM application 114 to process requests). Furthermore, the CIMOM selection program uses response time information which is obtained by issuing a message via Internet Control Message Protocol (ICMP) from the CIM application to the CIMOM. The response time information is an index for measuring the responsiveness of the front-end network to the CIMOM.

Upon receiving CIM request message 309, CIMOM 305 records an arrival time at service response time measurement facility 306. An analysis is performed with a lexical analysis facility in the CIMOM. In order to make the API unique to the management object device (which corresponds to the content of the CIM request message), execute and key data are retrieved from the CIM class and CIM object included with the CIM request message. By verifying key data with the repository database managed by the CIMOM, device API is executed. The device API corresponds to the CIM class and CIM object from the key data and is managed by the CIM provider. The device API connects the CIMOM to the CIM provider.

Upon receiving the CIM request message, the CIM provider performs processing according to the request and sends back resulting CIM response message 310 to the CIMOM. Upon receiving CIM response message 310 from the CIM provider, the CIM OM obtains a service response time by calculating the difference from the arrival time (which is recorded in advance in service response time measurement facility 306). Using this service response time, the service response time measurement facility updates an average service response time, which is stored in the CIM OM server. Thereafter, CIM OM 305 returns CIM response message 310 to CIM application 114.

Independent of the flow of the CIM request message, SLP advertise generation facility 307 refers (at a preset period) to the data storage, which keeps the average service response time data. The service response time measurement facility updates the service response time information by the CIM provider.

Figure 5:
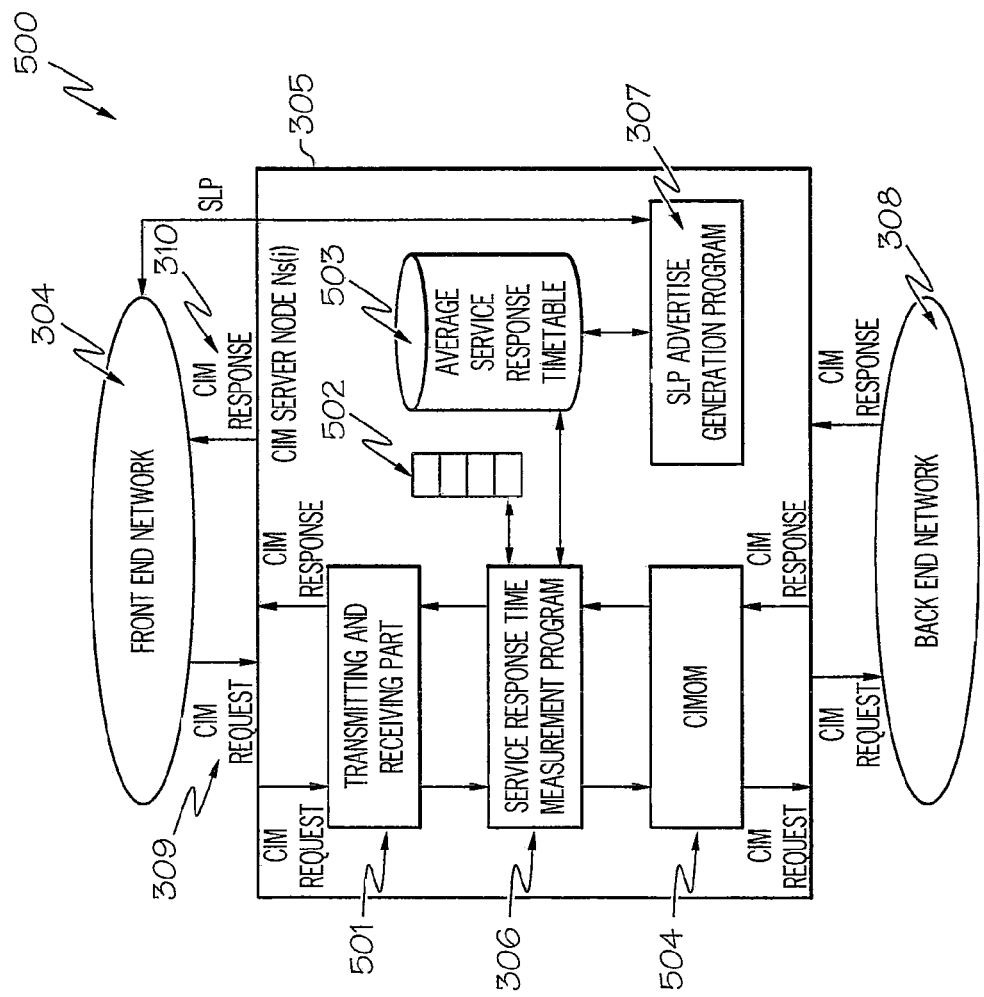
FIG. 5 illustrates the service response time measurement facility and the SLP advertise generation facility implemented in the same server node as the CIMOM, according to one embodiment of the invention.

FIG. 5 illustrates the service response time measurement facility and the SLP advertise generation facility implemented in the same server node as the CIMOM, according to one embodiment of the invention. Network 500 comprises CIM server node Ns(i) 305. CIM request message 309 initiated by a CIM application (not explicitly shown) is received via front-end network 304 at transmitting and receiving facility 501 (within Ns(i) 305). Included within CIM server node Ns(i) 305 is service response time measurement (SRTM) facility 306 which receives CIM request message 309 from transmitting and receiving facility 501. CIM server node Ns(i) 305 also comprises CIMOM 504 which (CIMOM 504) receives CIM request message 309 from SRTM facility 306. CIM server node Ns(i) 305 also comprises request-in-process queue 502, average service response timetable (file) 503 and SLP advertise generation facility 307. Network 500 comprises also comprises back-end network 308 through which CIM server node Ns(i) 305 is able to transfer CIM request message 309 to a CIM provider (not explicitly shown). CIM server node Ns(i) 305 is able to receive, via back-end network 308, CIM response message 310 from the CIM provider.

CIM request message 309 transmitted from a CIM application arrives at transmission and reception facility 501 of CIM server node Ns(i) 305 (which houses CIMOM 504) via front-end network 304. Upon receiving notification of arrival from transmission and reception facility 501, SRTM facility 306 begins. SRTM facility 306 compiles an arrival time, CIM class, CIM object, and key data of the (provider) management object device as jobs in process in request in-process queue 502. The CIM class, CIM object and key data of the device are included in CIM response message 310 issued by the CIM provider when completing the processing for CIM request message 309. The CIM class, CIM object and key data of the device are used for identifying the message request records accumulated in the queue, which (records) correspond to the response message. Furthermore, the (CIM request message) arrival time kept on record is used for calculating a time difference from the arrival time of CIM response message 310. Consequently, a service response time may be obtained. After completing the processing in SRTM facility 306, CIM request message 309 is passed to CIMOM 504.

CIM response message 310 from the CIM provider is accepted by CIMOM 504 and, after performing necessary processing, CIMOM 504 passes CIM response message 310 to SRTM facility 306. The CIM class, CIM object, and key data (of the provider device) are all included in CIM response message 310. The CIM class, CIM object, and key data identifies the corresponding record in request in-process queue 502. The service response time "tr (i, j)" is calculated as follows:

Service response time tr($i,j$)=Arrival time of CIM response message−Arrival time of CIM request message (unit [second]).

Here, i corresponds to the node number Ns (i) of the CIMOM processing the CIM request message, and j corresponds to the (management object) device number Np (j). After completing the process, the record in the corresponding request in-process queue is removed.

Average service response timetable 503 is implemented as a file. In order to update the service response time of CIM request message 309, the service response time measurement facility refers to the average service response time data Tr (i, j). The value of the sample number nr (i, j) factors into the calculation of the average service response time and is also stored in the timetable. By employing (1) the values currently stored in the timetable, (2) the formula for the calculation of service response time by the response and (3) the formulae for the average service response time (illustrated in the flow chart of FIG. 6), Tr(i, j) and nr(i, j) are updated.

Figure 6:
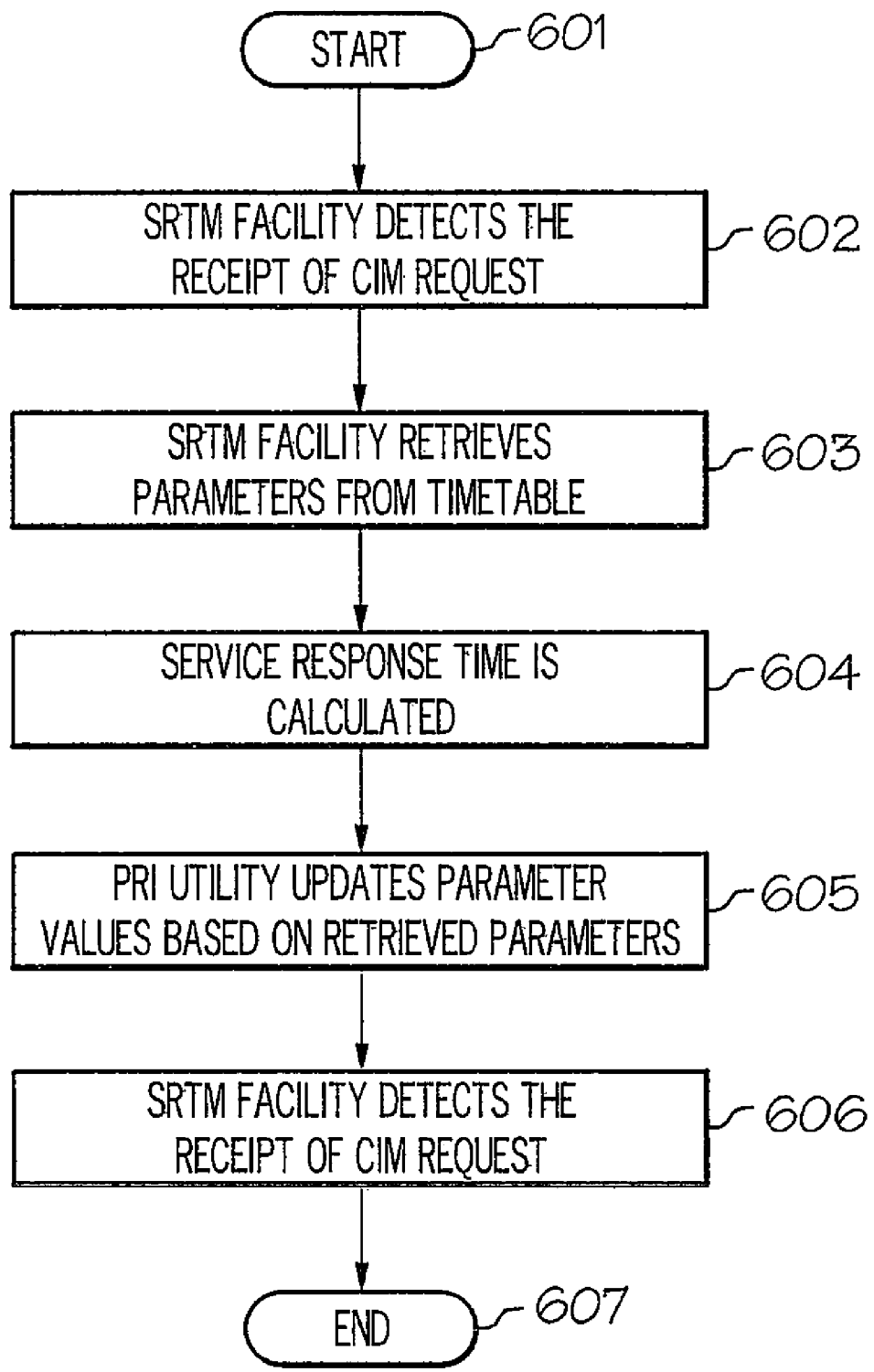
FIG. 6 is a flow chart illustrating the service response time measurement (SRTM) facility, according to one embodiment of the invention.

FIG. 6 is a flow chart illustrating the service response time measurement (SRTM) facility, according to one embodiment of the invention. The process begins at initiator block 601 and proceeds to block 602, at which, SRTM facility 306 detects the receipt of the CIM request message. At block 603, SRTM facility 306 retrieves a set of parameters from the average service response timetable. These parameters include (1) the previous average service response time (previous Tr (i,j)), (2) the service response time, "tr(i,j)" of the most recent CIM request message, and (3) the sample number "nr(i,j)". In one embodiment, the parameter "tr(i,j)" is calculated using service response time equation 1301 (FIG. 13), based on the most recent CIM response message from the CIM provider, as shown at block 604. At block 605, the remaining parameter values are updated. The average service response time (ASRT), "Tr(i,j)", is calculated using equation 1402 (FIG. 14), according to one embodiment. The sample number (nr (i,j)) is then updated using equation 1403 (FIG. 14). The ASRT is updated at block 606. Following the timetable update, the process ends at block 607.

There are two states for the arrival distribution of the CIM request message: (1) the state of a high arrival frequency, such as a period of time when a daytime operator is frequently working; and (2) the state of a low arrival frequency, such as a period of night time when almost no operation is performed. When a state continues under which a CIM request message does not arrive for many hours, the average service response time determination is no longer based on the content of the service response timetable. Instead, a request resting state compensation routine located in the same service response time measurement program is executed periodically. The period of execution (of the request resting state compensation routine) is established in such a way that the arrival frequency of the CIM request message is divided into a high frequency period of time (e.g., daytime) of the message arrival and a low frequency period of time (e.g., night time) of message arrival. During the low frequency period of message arrival, the request resting state compensation (RRSC) routine may be executed.

Figure 7:
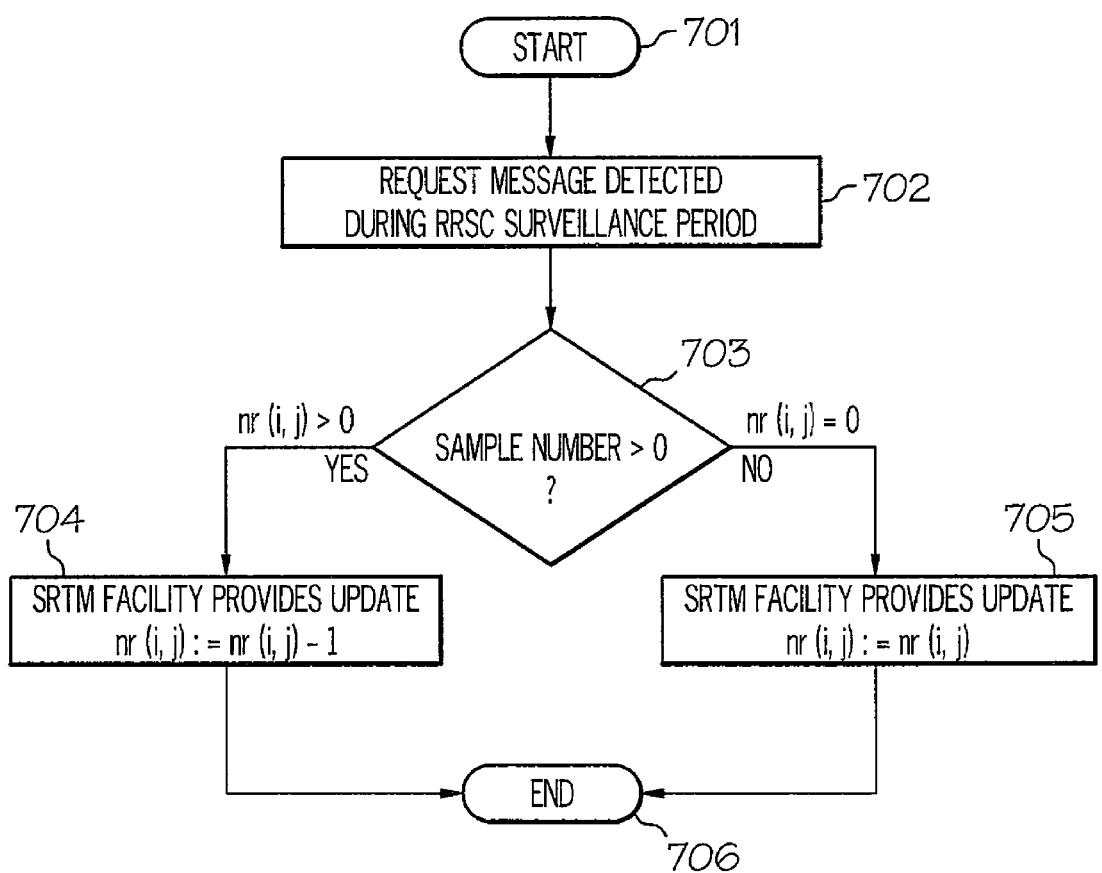
FIG. 7 is a flow chart illustrating the request resting state compensation routine executed within the high and low arrival period of the CIM request message, according to one embodiment of the invention.

FIG. 7 is a flow chart illustrating the request resting state compensation routine executed within the high and low arrival period of the CIM request message, according to one embodiment of the invention. In FIG. 7, the sample number nr (i, j), on which calculation of the average (from the average service response timetable) is based, is adjusted based on the particular time period. Here, i of the nr (i, j) corresponds to the CIMOM node Ns (i), and j corresponds to the device number Np (j). Regarding j, it is necessary to perform a request resting state compensation routine that corresponds to all devices connected via nodes of this CIMOM. That is, for all corresponding CIMOM Ns (i) and all devices Np (j) (CIM provider), nr (i, j) is updated by the value calculated in the flow chart of FIG. 7.

The process begins at initiator block 701 and proceeds to block 702, at which, a CIM request message is detected during the period of surveillance for which the request resting state compensation (RRSC) routine is executed. At decision block 703, the service response time measurement (SRTM) facility determines whether the number of the samples, "nr(i, j)", used in the calculation of the average service response time (during the surveillance period), is greater than zero. If the SRTM facility determines that nr(i,j) is greater than zero, the process move to block 704, at which, the SRTM facility adjusts the value of nr(i,j) in order to provide the update of the average service response time during the particular surveillance period. In particular, "1" is subtracted from nr(i,j). If the SRTM facility determines that nr(i,j) is not greater than zero (i.e., nr(i,j) is necessarily equal to "0"), the process move to block 705, at which, the SRTM facility maintains the value of nr(i,j) in order to provide the update of the average service response time during the particular surveillance period. The process ends at block 706.

Figure 8:
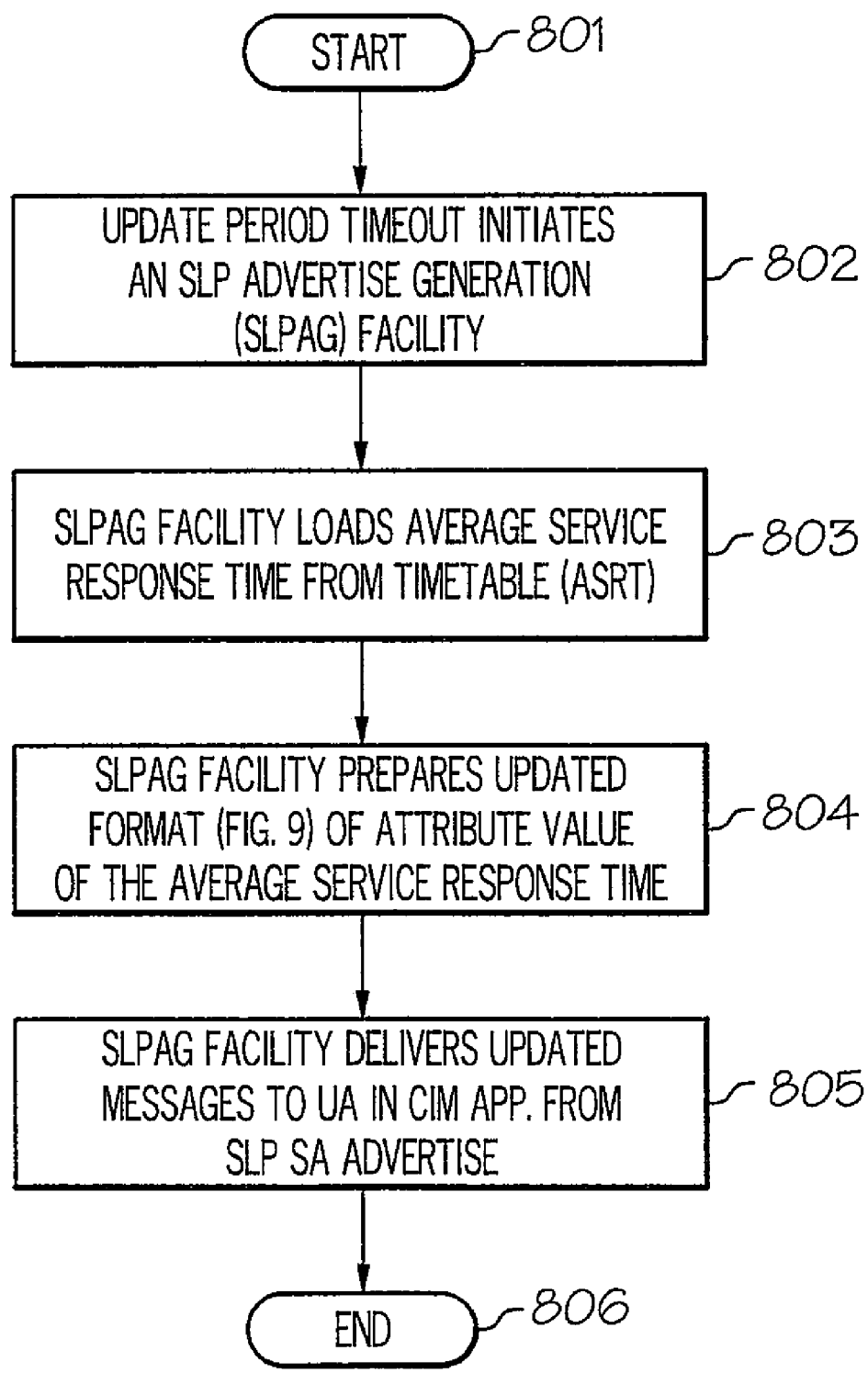
FIG. 8 is a flow chart illustrating the features and functionality of the SLP advertise generation (SLPAG) facility, according to one embodiment of the invention.

FIG. 8 is a flow chart illustrating the features and functionality of the SLP advertise generation (SLPAG) facility, according to one embodiment of the invention. The process begins at initiator block 801 and proceeds to block 802, at which, an update timeout event (following a preset time period) initiates the SLP advertise generation facility. The SLPAG facility subsequently forwards the latest average service response time value to a SLP SA (Service Agent) management daemon. The SLPAG facility retrieves the average service response time from the ASRT, as shown at block 803. At block 804, the SLPAG facility then prepares an updated format (FIG. 9) of the attribute value of the average service response time. The SLPAG facility delivers the update format via the SLP SA to the user agent (UA) for the CIM application requesting service response time information, as shown at block 805. The process ends at block 806.

Figure 9:
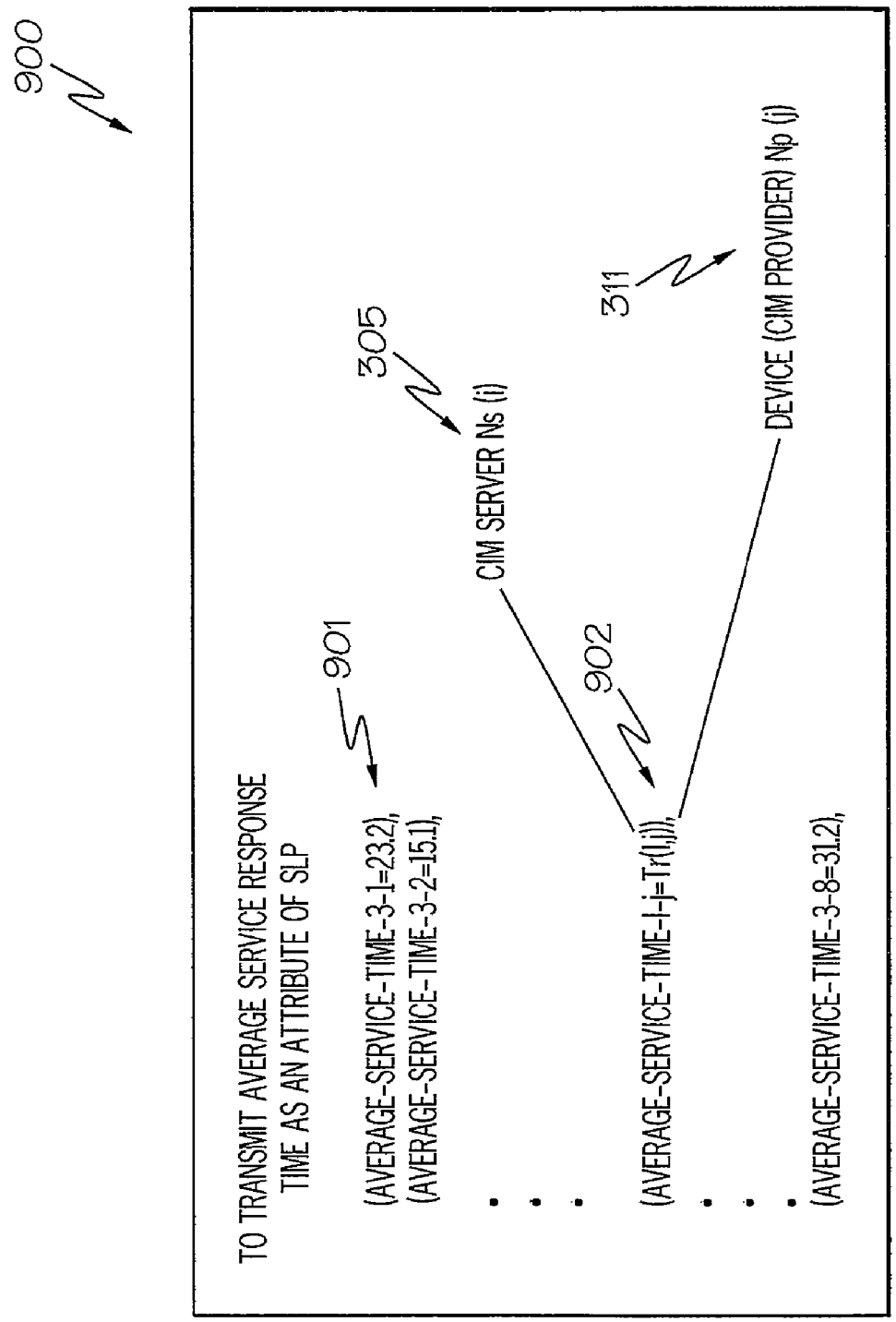
FIG. 9 illustrates the updated format of the attribute value of the average service response time which is forwarded to the Service Agent (SA) management daemon, according to one embodiment of the invention.

FIG. 9 illustrates the updated format of the attribute value of the average service response time which is forwarded to the SA management daemon, according to one embodiment of the invention. Format 900 comprises entry 901 and entry 902. Each entry (e.g., entry 902) includes an i-component (which represents a path which includes a particular CIM server, for example, the CIM server Ns(i) 305) and a j-component (which represents a path which includes a particular CIM provider, for example, the CIM provider (device) Np(j) 311). The i and j components collectively represent a path comprising both a particular CIM server and CIM provider (device) which corresponds to a specific average service response time. For example, the average service response time for a request message received by CIM server Ns(3) and processed by CIM provider (device) Np(1) is 23.2 (unit: time), as illustrated by entry 901.

In Format 900, an "average-service-time-i-j" (which may also be represented by Tr (i, j)) describes an average service response time in the path of the CIMOM Ns (i) and CIM provider device Ns (j). After the preparation of the updated format of the attribute value of the average service response time in the SLPAG facility, using an application programming interface (API) provided by the SLPAG facility, an SLP message with the updated format is delivered to the SLP SA management daemon and the value of the SLP advertise is updated. When an attribution acquisition request is issued from a UA (User Agent) in the CIM application, an SLP SA management daemon provides the UA (in the CIM application) with updated value.

Figure 10:
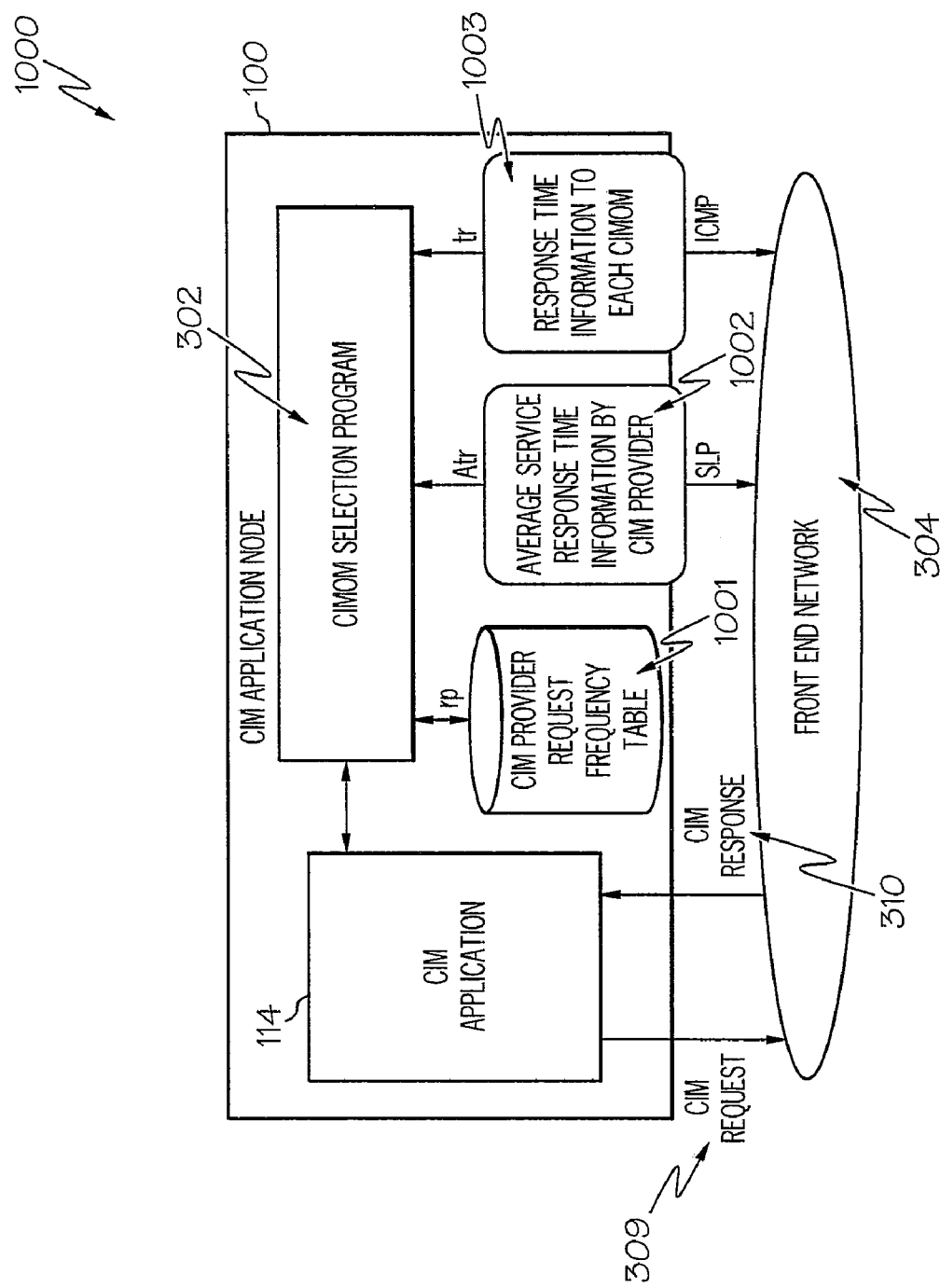
FIG. 10 is an illustration of the CIMOM selection program, according to one embodiment of the invention.

FIG. 10 is an illustration of the CIMOM selection program, according to one embodiment of the invention. Network 1000 comprises CIM client application node/DPS 100, which includes CIM application 114. CIM application 114 transmits CIM message request 309 via front-end network 304 to a CIMOM server node (not explicitly shown). CIM application node 100 also comprises CIMOM selection facility 302 which CIM application 114 uses to select the CIMOM to which the request message is sent. The selected CIMOM returns CIM response message 310 via front-end network 304 to CIM application 114. Additionally, CIM application node 100 comprises average service response time information 1002, and response time information 1003.

When selecting the CIMOM to dispatch CIM request message 309 to, CIM application 114 calls CIMOM selection facility 302, implemented in CIM application node 100. CIMOM selection facility 302 facilitates the update of CIM provider request frequency table 1001 every time a CIM request message is dispatched.

The CIMOM is selected and determined by the following: (1) CIM provider request frequency "rp" (provided by CIM provider request frequency table 1001); (2) average service response time by CIM provider "Atr" (provided by average service response time information 1002); and (3) average response time "Tr" obtained from the response time "tr" to each CIMOM ("tr" provided by response time information 1003).

Figure 11:
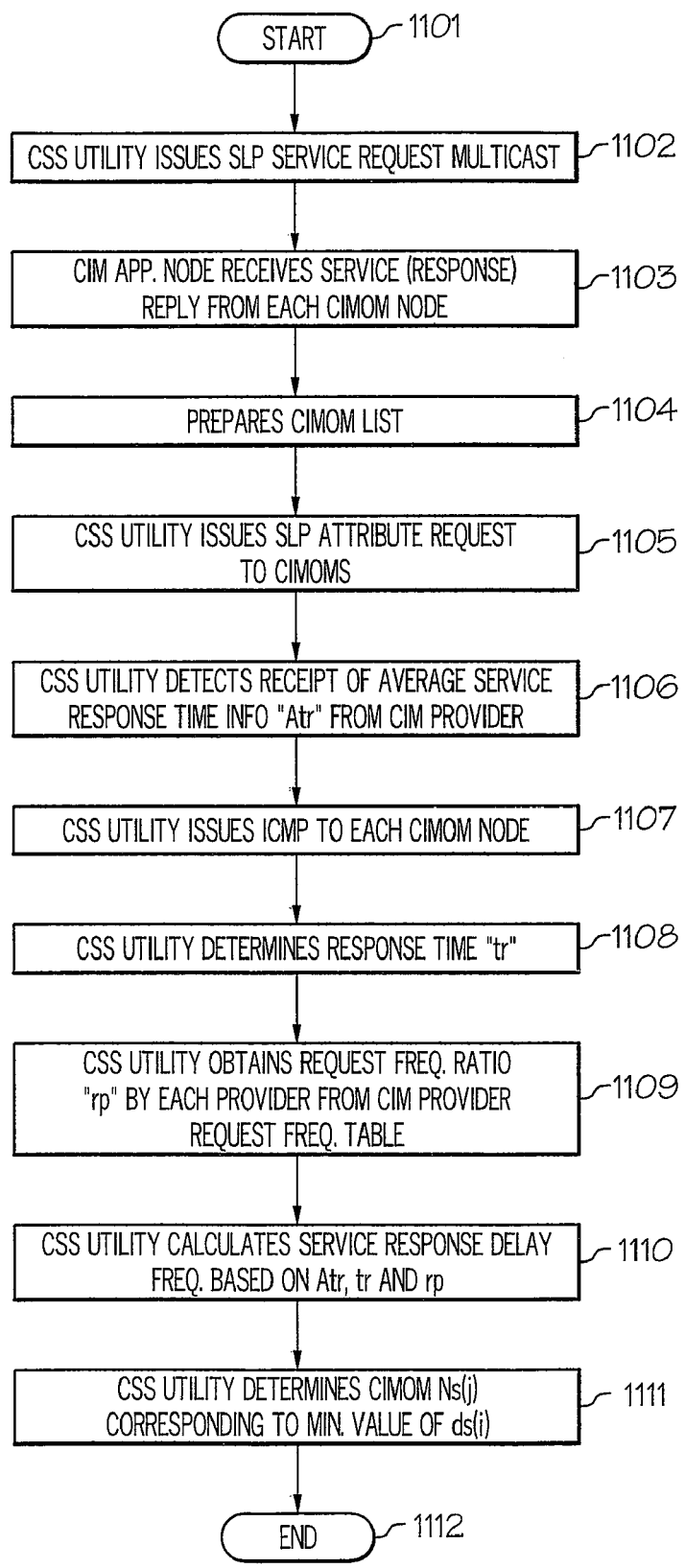
FIG. 11 is a flow chart illustrating the operational flow of the CIMOM selection facility, according to one embodiment of the invention.

FIG. 11 is a flow chart illustrating the operation flow of the CIMOM selection facility, according to one embodiment of the invention. The process of FIG. 11 begins at initiator block 1101 and proceeds to block 1102, at which CSS utility 110 initiates a multicast service request via the SLP to ultimately select a CIMOM server node which receives a request message. A subsequent multicast service reply allows the CIM application to prepare a connectable CIMOM list. At block 1103, the CIM application node receives a service reply from a Service Agent (SA) of the SLP on each CIMOM node (as a response to the multi-cast). Based on the service reply, an operable CIMOM list is prepared, as shown at block 1104. For illustration purposes, these CIMOMs are described as Ns(1), Ns(2), ..., Ns(i), ..., Ns(n).

Based on the prepared CIMOM list, in order to obtain service response time "Atr(i,j)" by a CIM provider, an SLP attribute request is issued to all CIMOMs, as shown at block 1105. A response to the request is received, as shown at block 1106. The value obtained by the request has an average actual response time "Tr(i,j)" (unit: second). However, based on the updated format shown in FIG. 9, normalization (of "Tr(i,j)") is performed to facilitate a calculation with the other evaluation parameters (described in FIG. 10). Further processing is executed with Atr(i, j) instead of Tr(i, j).

The procedure for normalization is explained as follows: For the (CIM provider) device "Np(j)", an average service response time "Trp (j)" for all CIMOM server nodes "Ns (i)" ($1 \leq i \leq n$) is obtained via equation 1301 (FIG. 13). The paired average ratio (service response time) Atr (i, j) is given as follows (equation 1302) (FIG. 13):

$$Atr(i,j) = Tr(i,j)/Trp(j)$$

A matrix expression Atr of Atr (i, j) is described via equation 1303 (FIG. 13) for all CIMOM server nodes Ns (i) ($1 \leq i \leq n$) and (CIM provider) device Np (j) ($1 \leq j \leq m$).

Acquisition of the CIMOM average response time tr: Based on the CIMOM request path(s), an ICMP echo packet is issued a preset number of times to obtain (a preset number of samples of) CIMOM response times for each CIMOM within a cluster of CIMOM servers, as shown at block 1107. The ICMP is configured as an application in each CIMOM. The CIMOM response time is based on the following CIMOM response time components: (1) the time taken to receive an ICMP echo packet at the CIMOM from the CIM application; and (2) the time taken to receive an ICMP echo packet at the CIM application from the CIMOM. At block 1108, average response time is calculated, based on the CIMOM response times and the number of samples taken, and a row vector tr with an average response time tr (i) corresponding to each CIMOM Ns (i), is described via equation 1304 (FIG. 13).

At block 1109, a CIM provider request frequency table is updated, following the CIM client dispatch of a CIM request message to the CIMOM. In the CIM provider request frequency table, a frequency is described for the CIM provider device which processes/receives the CIM request, regardless of the specification of the CIMOM. The frequency is described by the normalized value of (the ratio) rp (j). The "rp(j)" value is updated each time the CIM client generates a request message. The "rp (j)" value is calculated based on a running moving average (illustrated in FIG. 12).

A column vector rp (which contains request frequency values for all management object devices) having rp(j) (corresponding to the CIM provider (device) Np (j)) as an element is described as follows:

$$(Vector) rp = (rp(1) \, rp(2) \, rp(j) \ldots rp(m))$$

Figure 12:
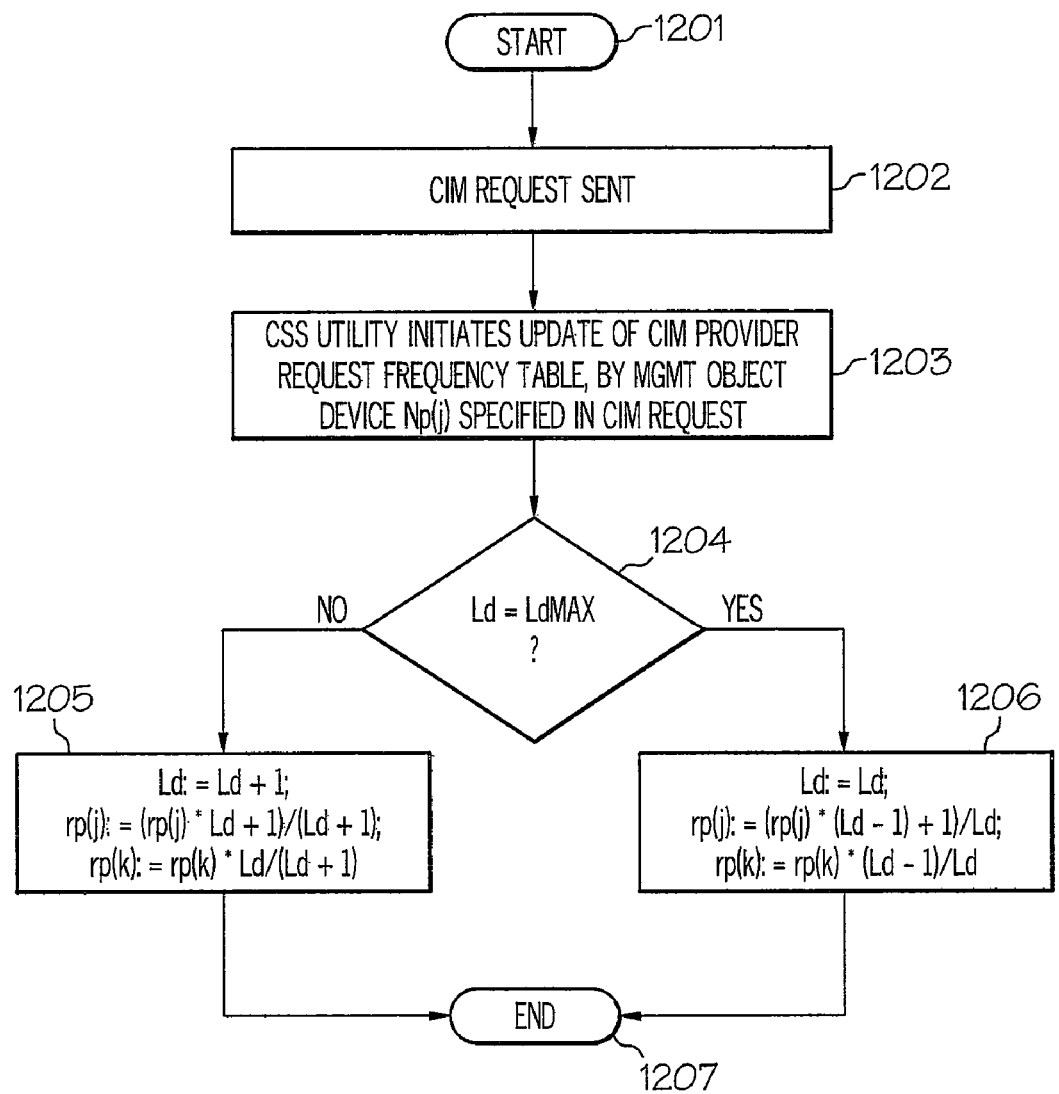
FIG. 12 is a flow chart illustrating an update procedure of the CIM provider request frequency table, according to one embodiment of the invention.

The "rp (j)" value is calculated by the process in FIG. 12. The "rp (j)" value is normalized, so that the sum of all elements is 1. Equation 1401 (FIG. 14) depicts the normalized equation.

At block 1110, a service response delay frequency "ds", which is an index of the CIMOM selection, is calculated from Atr, rp, and ts as illustrated by equation 1405 (FIG. 14). In order to match the unit of average response time "ts" (of the CIMOM) in the second term of equation 1405 (FIG. 14), the first term is multiplied by an average over all CIMOM Ns (i) and all devices (CIM provider) Np (j). Load balance is maintained when the units of each term do match. Furthermore, by employing the multiplication factor/weight of "rp" in the (first term of the) "ds" calculation of equation 1406 (FIG. 14), the (precision of the calculation of) response time to the (CIM provider) device which the client node frequently accesses, is improved.

At block 1111, the element ds(i) with the minimum value of a row vector set "ds" (where "ds" is calculated via equation 1405, 1406) is selected. CIMOM Ns (i) corresponding to the selected ds (i) becomes the output of the CIMOM selection program. The "ds (i)" value is obtained as follows: ds(i) =min{ds(1) ds(2) ... ds(i) ... ds(n)}. The process ends at block 1112.

Although the methods illustrated in FIG. 11 may be described with reference to components shown in FIGS. 1, and 3-10, it should be understood that this is merely for convenience and alternative components and/or configurations thereof can be employed when implementing the various methods. Key portions of the methods may be completed by CSS utility 110 executing within DPS 100 (FIG. 1) along with CIM application 114 and controlling specific operations of/on DPS 100, and the methods are thus described from the perspective of either/both CSS utility 110/CIM application 114 and DPS 100.

FIG. 12 is a flow chart illustrating an update procedure of the CIM provider request frequency table, according to one embodiment of the invention. The process of FIG. 12 begins at initiator block 1201 and proceeds to block 1202, at which a CIM request message is sent. The request message triggers an update of the CIM provider request frequency table, as shown at block 1203. The provider request frequency table is updated by the management object device (provider) specified in the CIM request message. At decision block 1204, CSS utility 110 determines whether "Ld", the number of samples of the moving average (per time period, which may alternatively be referred to as "stationary time") is equal to a preset/specified maximum value, "Ldmax". If Ld is equal to Ldmax, the process moves to block 1205, at which, "Ld", "rp(j)" and "rp(k)" receive updates according to the equations shown in block 1205. If Ld is not equal to Ldmax, the process moves to block 1206, at which, Ld, rp(j) and rp(k) receive updates according to the equations shown in block 1206. The "rp(j)" value is the request frequency ratio which corresponds to the request message (processed by provider Np(j)) that initiated the update procedure. The "rp(k)" value refers to the request frequency ratio which corresponds to devices other than the provider device Np(j). Initially, the values of Ld, rp(j) and rp(k) are all "0". With the updates completed, the process ends at block 1207.

As introduced within the descriptions of the flow charts above, FIGS. 13, 14 illustrate a number of equations by which features of the invention may be advantageously implemented, according to one embodiment of the invention.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a computer network system comprising a computer system executing an Common Information Model (CIM) application software, which network system includes at least a single Common Information Model Object Manager (CIMOM) server, running the CIM server software, wherein said CIMOM server connects to one of a plurality of CIM provider servers, a method comprising:

receiving, at a CIMOM selection facility, CIM provider request frequency (rp) data, average service response time (Atr) data, and response time (tr) data;

selecting, via the CIMOM selection facility, the CIMOM server to transmit a request based on a normalization of the received rp data, Atr data, and tr data;

transmitting, by a CIM application via a first network, a first CIM request message to the selected CIMOM;

updating a request frequency table at the time of transmission of the request message, wherein said table provides data which indicates the rate at which a request is transferred for an intended provider;

detecting a receipt of the transmitted first CIM request message at the selected CIMOM;

triggering a set of processing steps when the request is received by the selected CIMOM;

generating, by the selected CIMOM, a second CIM request message in response to receiving the first CIM request message;

transmitting, via a second network, the second CIM request message to a CIM management device;

generating, via the CIM management device, a first CIM response message in response to receiving the second CIM request message;

transmitting, via the second network, the first CIM response message to the selected CIMOM;

generating, via the selected CIMOM, a second CIM response message in response to receiving the first CIM response message; and transmitting, via the first network, the second CIM response message to the CIM application.

2. The method of claim 1, wherein said triggering further comprises:

recording an arrival time of the request message via a service response time measurement facility;

retrieving data from the request message wherein said data uniquely identifies the request message;

transferring the request message to a provider server via an application programming interface (API), to generate a response message;

generating a response message;

forwarding the response message to the CIMOM;

recording an arrival time of the response message via the service response time measurement facility;

calculating a provider response time from a difference of the response message arrival time and the request message arrival time;

updating an average service response time value wherein said average service response time value is stored in a memory; and transferring the response message to the client.

3. The method of claim 1, wherein said normalization of the received rp data, Atr data, and tr data comprises:

transmitting an ICMP echo packet to each server at a preset number of time instances to obtain a plurality of first component response times to each server;

when the transmitted packet is received by the server, initiating the transmission of a return ICMP echo packet from the server to the application at a preset number of time instances to obtain a plurality of second component response times from each server;

retrieving the first component response time from the server;

computing the CIMOM response time by the addition of the first component response time and the second component response time;

compiling a plurality of the CIMOM response times; and obtaining the average CIMOM response time for the server by dividing a sum of the plurality of the CIMOM response times by the preset number of time instances.

4. The method of claim 1, wherein said selecting further comprises:
  computing a service response delay frequency for one or more CIMOM servers, wherein said service response delay frequency is proportional to one or more of a plurality of formulaic procedures wherein said procedures include one or more of the following components: (1) CIMOM average response time; (2) CIM provider average response time; and (3) CIM provider request frequency; and
  selecting the ideal CIMOM server as the CIMOM server with the minimum service response delay frequency.

5. The method of claim 1, wherein said receiving, rp data, Atr data, and tr data comprises:
  issuing a multicast service request to a plurality of CIMOM servers within the computer network system;
  generating a list of the accessible and functional CIMOM servers within the computer network system with a receipt of a response to the service request, wherein said response is received from a number of CIMOM servers;
  submitting an acquisition request to each CIMOM server on the generated list of CIMOM servers, to obtain an updated value of the average service response time from each CIMOM server; and
  retrieving the updated value of the average service response time from each one of the CIMOM servers from a response to the acquisition request, wherein said response contains the update value.

6. The method of claim 1 further comprising:
  initiating a series of steps to provide an updated format value for the average service response time with the generation of a predetermined timeout, wherein said timeout is a result of a trigger with a preset timing, wherein said steps include one or more of the following:
    executing a service location protocol (SLP) advertise generation facility;
    loading, with the aid of the SLP facility, an information file of a plurality of entries, wherein each one of the said entries is an average service response time for a corresponding CIMOM server;
    preparing an updated format of the average service response time; and
    when the acquisition request is submitted, alternatively providing the updated format of the average service response time.

7. A data processing system comprising:
  a processor that executes Common Information Model (CIM) application software;
  a memory system that stores the CIM application software;
  a first network connecting the processor to one or a plurality of Common Information Model Object Manager (CIMOM) server systems;
  a second network connecting the one or the plurality of CIMOM server systems to one or a plurality of management devices; and
  a utility executing on the processor, wherein the data processing system performs the functions of:
    receiving, at the processor, CIM provider request frequency (rp) data, average service response time (Atr) data, and response time (tr) data;
    selecting, via the utility, a CIMOM server system to transmit a request based on a normalization of the received rp data, Atr data, and tr data;
    transmitting, by the processor, a first CIM request message to the selected CIMOM server system, wherein said CIMOM server system;
    updating a request frequency table at the time of transmission of the first CIM request message, wherein said table provides data which indicates the rate at which a request is transferred for an intended provider;
    detecting a receipt of the transmitted first CIM request message at the selected CIMOM;
    triggering a set of processing steps when the request is received by the selected CIMOM;
    generating, by the selected CIMOM, a second CIM request message in response to receiving the first CIM request message;
    transmitting, via the second network, the second CIM request message to the one or one of the plurality of management devices;
    generating, via the one or one of the plurality of management devices, a first CIM response message in response to receiving the second CIM request message;
    transmitting, via the second network, the first CIM response message to the selected CIMOM;
    generating, via the selected CIMOM, a second CIM response message in response to receiving the first CIM response message; and
    transmitting, via the first network, the second CIM response message to the processor.

8. The data processing system of claim 7, wherein said functions for triggering further comprises functions for:
  recording an arrival time of the request message via a service response time measurement facility;
  retrieving data from the request message wherein said data uniquely identifies the request message;
  transferring the request message to a provider server via an application programming interface (API), to generate a response message;
  generating a response message;
  forwarding the response message to the CIMOM;
  recording an arrival time of the response message via the service response time measurement facility;
  calculating a provider response time from a difference of the response message arrival time and the request message arrival time;
  updating an average service response time value wherein said average service response time value is stored in a memory; and
  transferring the response message to the client.

9. The data processing system of claim 7, wherein said normalization of the received rp data, Atr data, and tr data comprises:
  transmitting an ICMP echo packet to each server at a preset number of time instances to obtain a plurality of first component response times to each server;
  when the transmitted packet is received by the server, initiating the transmission of a return ICMP echo packet from the server to the application at a preset number of time instances to obtain a plurality of second component response times from each server;
  retrieving the first component response time from the server;
  computing the CIMOM response time by the addition of the first component response time and the second component response time;
  compiling a plurality of the CIMOM response times; and
  obtaining the average CIMOM response time for the server by dividing a sum of the plurality of the CIMOM response times by the preset number of time instances.

10. The data processing system of claim 7, wherein said functions for selecting further comprises functions for:
 computing a service response delay frequency for one or more CIMOM servers, wherein said service response delay frequency is proportional to one or more of a plurality of formulaic procedures wherein said procedures include one or more of the following components: (1) CIMOM average response time; (2) CIM provider average response time; and (3) CIM provider request frequency; and
 selecting the ideal CIMOM server as the CIMOM server with the minimum service response delay frequency.

11. The data processing system of claim 7, wherein said receiving, rp data, Atr data, and tr data comprises:
 issuing a multicast service request to a plurality of CIMOM servers within the computer network system;
 generating a list of the accessible and functional CIMOM servers within the computer network system with a receipt of a response to the service request, wherein said response is received from a number of CIMOM servers;
 submitting an acquisition request to each CIMOM server on the generated list of CIMOM servers, to obtain an updated value of the average service response time from each CIMOM server; and
 retrieving the updated value of the average service response time from each one of the CIMOM servers from a response to the acquisition request, wherein said response contains the update value.

12. The data processing system of claim 7 further comprising functions for:
 initiating a series of steps to provide an updated format value for the average service response time with the generation of a predetermined timeout, wherein said timeout is a result of a trigger with a preset timing, wherein said steps include one or more of the following:
  executing a service location protocol (SLP) advertise generation facility;
  loading, with the aid of the SLP facility, an information file of a plurality of entries, wherein each one of the said entries is an average service response time for a corresponding CIMOM server;
  preparing an updated format of the average service response time; and
  when the acquisition request is submitted, alternatively providing the updated format of the average service response time.

13. A computer program product comprising:
 a non-transitory computer readable medium; and
 program code on said non-transitory computer readable medium that when executed within a data communication device generating application data via a network, said program code provides the functionality of:
 receiving, at a CIMOM selection facility via a first network, CIM provider request frequency (rp) data, average service response time (Atr) data, and response time (tr) data;
 selecting, via the CIMOM selection facility, a CIMOM server to transmit a request based on a normalization of the received rp data, Atr data, and tr data;
 transmitting a first CIM request message to the selected CIMOM server;
 updating a request frequency table at the time of transmission of the request message, wherein said table provides data which indicates the rate at which a request is transferred for an intended provider;
 detecting a receipt of the transmitted first CIM request message at the selected CIMOM server;
 triggering a set of processing steps when the first CIM request is received by the selected CIMOM server;
 generating, by the selected CIMOM server, a second CIM request message in response to receiving the first CIM request message;
 transmitting, via a second network, the second CIM request message to a management device;
 generating, via the management device, a first CIM response message in response to receiving the second CIM request message;
 transmitting, via the second network, the first CIM response message to the selected CIMOM server;
 generating, via the selected CIMOM server, a second CIM response message in response to receiving the first CIM response message; and
 transmitting, via the first network, the second CIM response message to the CIMOM selection facility.

14. The computer program product of claim 13, wherein said code for triggering further comprises code for:
 recording an arrival time of the request message via a service response time measurement facility;
 retrieving data from the request message wherein said data uniquely identifies the request message;
 transferring the request message to a provider server via an application programming interface (API), to generate a response message;
 generating a response message;
 forwarding the response message to the CIMOM;
 recording an arrival time of the response message via the service response time measurement facility;
 calculating a provider response time from a difference of the response message arrival time and the request message arrival time;
 updating an average service response time value wherein said average service response time value is stored in a memory; and
 transferring the response message to the client.

15. The computer program product of claim 13, wherein said normalization of the received rp data, Atr data, and tr data comprises code for:
 transmitting an ICMP echo packet to each server at a preset number of time instances to obtain a plurality of first component response times to each server;
 when the transmitted packet is received by the server, initiating the transmission of a return ICMP echo packet from the server to the application at a preset number of time instances to obtain a plurality of second component response times from each server;
 retrieving the first component response time from the server;
 computing the CIMOM response time by the addition of the first component response time and the second component response time;
 compiling a plurality of the CIMOM response times; and
 obtaining the average CIMOM response time for the server by dividing a sum of the plurality of the CIMOM response times by the preset number of time instances.

16. The computer program product of claim 13, wherein said code for selecting further comprises code for:
 computing a service response delay frequency for one or more CIMOM servers, wherein said service response delay frequency is proportional to one or more of a plurality of formulaic procedures wherein said procedures include one or more of the following components: (1) CIMOM average response time; (2) CIM provider average response time; and (3) CIM provider request frequency; and selecting the ideal CIMOM server as the CIMOM server with the minimum service response delay frequency.

17. The computer program product of claim 13, wherein said code for receiving, rp data, Atr data, and tr data comprises code for:

issuing a multicast service request to a plurality of CIMOM servers within the computer network system;

generating a list of the accessible and functional CIMOM servers within the computer network system with a receipt of a response to the service request, wherein said response is received from a number of CIMOM servers;

submitting an acquisition request to each CIMOM server on the generated list of CIMOM servers, to obtain an updated value of the average service response time from each CIMOM server; and retrieving the updated value of the average service response time from each one of the CIMOM servers from a response to the acquisition request, wherein said response contains the update value.

18. The computer program product of claim 13 further comprising code for:

initiating a series of steps to provide an updated format value for the average service response time with the generation of a predetermined timeout, wherein said timeout is a result of a trigger with a preset timing, wherein said steps include one or more of the following:

executing a service location protocol (SLP) advertise generation facility;

loading, with the aid of the SLP facility, an information file of a plurality of entries, wherein each one of the said entries is an average service response time for a corresponding CIMOM server;

preparing an updated format of the average service response time; and when the acquisition request is submitted, alternatively providing the updated format of the average service response time.

* * * * *